United States Patent [19]
Hill

[11] Patent Number: 5,653,097
[45] Date of Patent: Aug. 5, 1997

[54] TREE SHAKER PAD

[75] Inventor: Daryl G. Hill, Yakima, Wash.

[73] Assignee: Orchard-Rite Ltd., Inc., Yakima, Wash.

[21] Appl. No.: 563,233

[22] Filed: Nov. 28, 1995

[51] Int. Cl.$^6$ ............................................. A01D 46/26
[52] U.S. Cl. .............................. 56/340.1; 56/328.1
[58] Field of Search ......................... 56/340.1, 328.1, 56/327.1, 330; 184/5, 6, 27.1, 100

[56] References Cited

U.S. PATENT DOCUMENTS

| | | | |
|---|---|---|---|
| 3,123,965 | 3/1964 | McEwen | 56/328 |
| 3,178,875 | 4/1965 | McEwen | 56/328 |
| 3,780,510 | 12/1973 | Tompkins | 56/328 TS |
| 4,128,986 | 12/1978 | Santarelli | 56/328 TS |
| 4,254,608 | 3/1981 | Friday | 56/328 TS |
| 4,521,468 | 6/1985 | Brandt | 428/35 |
| 4,757,674 | 7/1988 | Compton | 56/340.1 |
| 4,768,332 | 9/1988 | Bizzini | 56/340.1 |
| 4,893,458 | 1/1990 | Compton | 56/340.1 |
| 4,921,073 | 5/1990 | Compton | 184/11.2 |
| 4,932,195 | 6/1990 | Compton | 56/340.1 |
| 5,103,625 | 4/1992 | McCrill | 56/340.1 |
| 5,385,006 | 1/1995 | Compton | 56/340.1 |

FOREIGN PATENT DOCUMENTS 934973  1/1982  U.S.S.R. .

*Primary Examiner*—Terry Lee Melius
*Attorney, Agent, or Firm*—Jacobson, Price, Holman & Stern, PLLC

[57] ABSTRACT

A tree shaker pad for each of the clamping jaws of a nut or fruit tree shaker. The tree shaker pad includes a hollow pillow of cylindrical or oval shaped cross-sectional configuration of resilient material with the pillow being substantially filled with a plurality of resilient members having void area or interstices therebetween. The pillow is provided with a water or other liquid coolant inlet at one end and a water or liquid coolant outlet adjacent the other end of circulation of water or liquid coolant through the pillow when the jaws of the tree shaker are in unclamped relation to the tree trunk. The resilient members, preferably rubber balls, are compressed when the jaws are in clamping relation to a tree trunk and will maintain a degree of flexibility and elasticity to provide better conformity of the pad with the tree trunk when the jaws are in clamped position. The rubber ball forming the filler medium will return to their original configuration when the jaws are moved to unclamped position thereby returning the void areas or interstices to their original size and communication for circulation of water or liquid coolant through the pillow for maintaining optimum operating temperature of the tree shaker pads on the clamp jaws of the tree shaker.

9 Claims, 2 Drawing Sheets

TREE SHAKER PAD

BACKGROUND OF THE INVENTION

1. Field of the Invention

The present invention generally relates to a tree shaker pad and sling assembly associated with a nut tree shaker. Nut tree shakers include a shaking head having a clamping device engaging and clamping the tree to enable the tree shaker to impart the desired shaking forces to the tree for separating nuts from the tree twigs and branches. This type of device is well known for harvesting nuts from nut trees, fruit from fruit trees and the like. The present invention generally relates to a tree shaker pad and sling assembly in which the shaker pad includes a hollow resilient pillow filled with resilient members in the form of spherical rubber or elastomer balls.

2. Discussion of the Prior Art

The purpose of the nut shaker pads and slings is to transfer the shaking energy of the shaking head of the nut shaker to the nut tree without damage or injury to the bark on the tree trunk. Presently, two types of shaker pads are in use. One type of pad that is in use is a solid rubber pad of cylindrical or oval cross-sectional configuration with or without a hole extending axially through the center of the pad. The second type of pad that is in use is a rubber cylindrical hollow pillow filled with some type of granular material such as walnut shells, glass beads or small flat plastic pieces.

The solid rubber pad has the advantages of being simpler in construction thus making it simpler to build at less cost. The solid rubber pad is also safer in use as compared to filled pillow pads. The filled pillow pads have the advantages of better conformity the tree trunk when grasped by the shaker head which tends to spread the shaker head vibrator load over a larger area of the tree trunk and therefore does not stress or damage the bark on the tree truck as occurs when a more concentrated load is applied. However, the internal granular material or other medium which fills the pillow pad can get very hot due to friction created in the medium which fills the pillow pad when the shaking operation takes place. In some instances, it has been known that filled pillow pads will catch fire and explode during use which can create a hazardous situation that can not only damage the tree but also possibly injure an operator of the tree shaker. Various methods have been developed in an effort to cool filled pillow pads with the most common effort being the circulation of cooling air through the pads. However, another problem with the filled pillow pads is that when they are clamped tight they become very rigid or hard and thus eliminate some of the advantage of better conformity whereas the solid rubber pads maintain a greater degree of flexibility in a clamped position which tends to lessen the shock loads on the bark of the tree trunk.

My copending U.S. application Ser. No. 08/385,437 filed Feb. 8, 1995 for Cooling and Lubricating System for Nut Tree Shaker discloses a system for cooling and lubricating the slings and pad on a nut tree shaker. The following prior patents disclose other relevant developments in nut tree shakers and shaker pads and slings associated with nut tree shakers.

| | |
|---|---|
| 3,123,965 | 4,768,332 |
| 3,178,875 | 4,893,458 |
| 3,780,510 | 4,921,073 |
| 4,128,986 | 4,932,195 |
| 4,254,608 | 5,103,625 |
| 4,521,468 | 5,385,006 |
| 4,757,674 | Russian Patent No. 934,973 |

While the several Compton patents disclose various shaker pads including shaker pads having a cooling feature, they do not disclose a filled cushion type pad. U.S. Pat. No. 4,521,468 to Brandt discloses a filled pillow shaker pad in which the granular material is disclosed as plastic bits impregnated with a high melting temperature lubricant. The plastic bits are disclosed as being short cylindrical rods or chips. This patent also states that the granular material filling the pillow may be coarse sand, metal particles or plastic bits and also mentions that broken walnut shell pieces have been used and indicates that it is desirable to loosen compacted material after each use by air or other fluid.

None of the prior patents disclose a filled pillow tree shaker pad having water or other liquid coolant circulating therethrough in which the filler medium for the pillow type tree shaker pad is filled with resilient members such as spherical resilient balls of rubber or other elastomers which better conform to the tree trunk and also maintain a degree of flexibility in the clamped position in view of their resiliency and, when released from the clamped position, the filler medium returns to their spherical shape to permit voids to develop between the balls which enables water or other coolant to migrate through the interior of the pillow pad thereby effecting cooling the pillow pad during use.

SUMMARY OF THE INVENTION

An object of the present invention is to provide a nut tree shaker pad in the form of a hollow pillow, generally cylindrical or oval in cross-sectional shape and having an inlet and an outlet for circulation of water or other coolant therethrough with the hollow interior of the pillow pad being provided with a filler medium in the form of small resilient members having peripheral surface areas spaced from each other to form interstices when the pad is unclamped to enable circulation of water or coolant and which will compress for effectively conforming to the shape of the tree trunk when compressed with the resilient members maintaining a degree of flexibility even when the shaker pad is in clamped relation to a tree trunk.

Another object of the invention is to provide a nut tree shaker pad in accordance with the preceding object in which the resilient members are in the form of rubber or elastomer spherical balls which will compress to enable the pad to conform with the tree trunk and still maintain a degree of flexibility and which will return to their original, generally spherical shape when unclamped thereby developing void areas between the balls which lets water or other coolant migrant through the interior of the pillow type tree shaker pad.

A further object of the invention is to provide a nut tree shaker pad in accordance with the preceding objects in which the pillow type pad and its filler medium which enables circulation of a coolant through the pad can be used with various existing nut tree shaker pads and slings including sling arrangements having various coolant and lubricating physical capabilities and sling and pad assemblies utilizing a mist type coolant arrangement.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
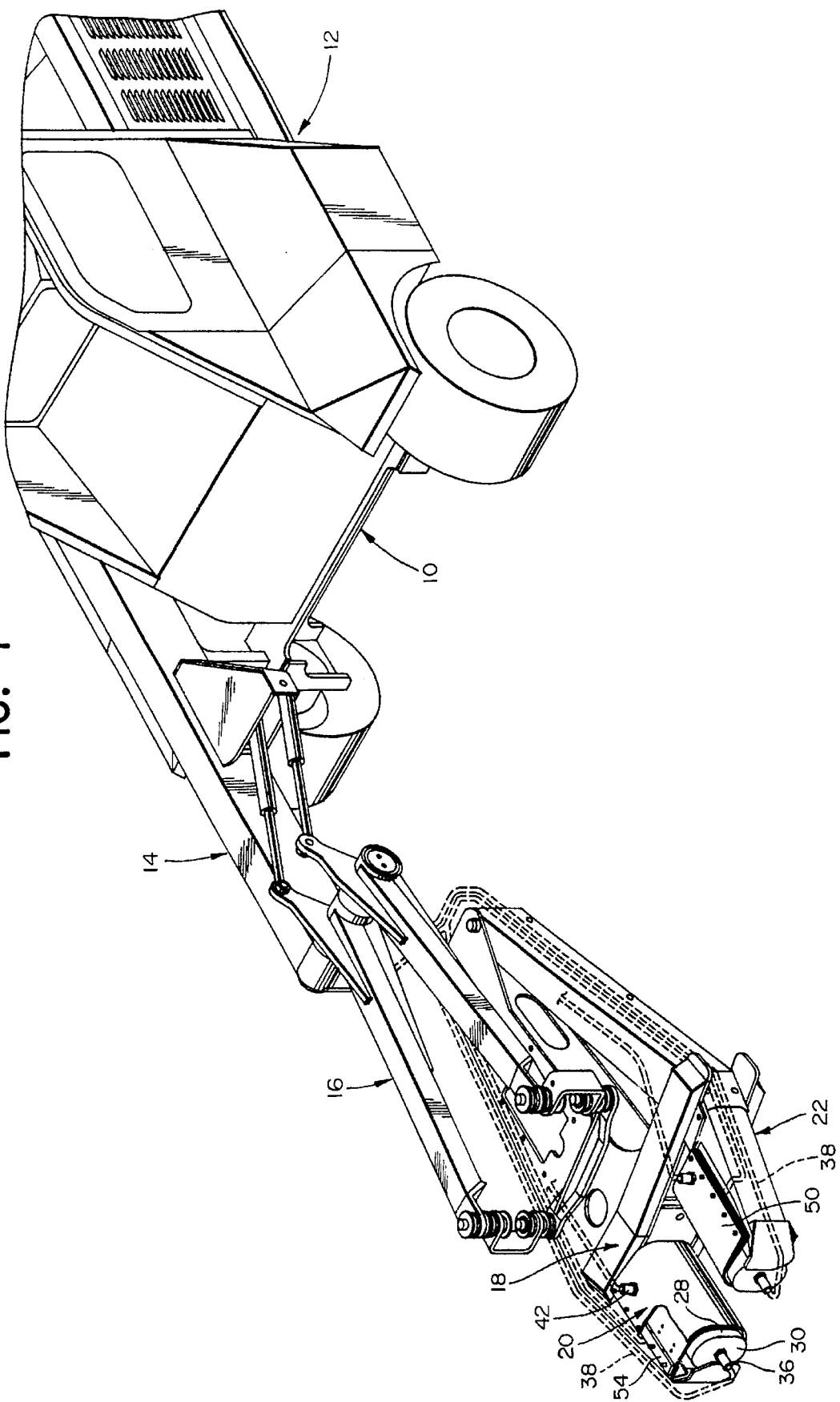
FIG. 1 is a schematic perspective view illustrating a nut tree shaker with the pillow type shaker pad of the present invention incorporated into the clamping jaws of the shaker head.
Figure 4:
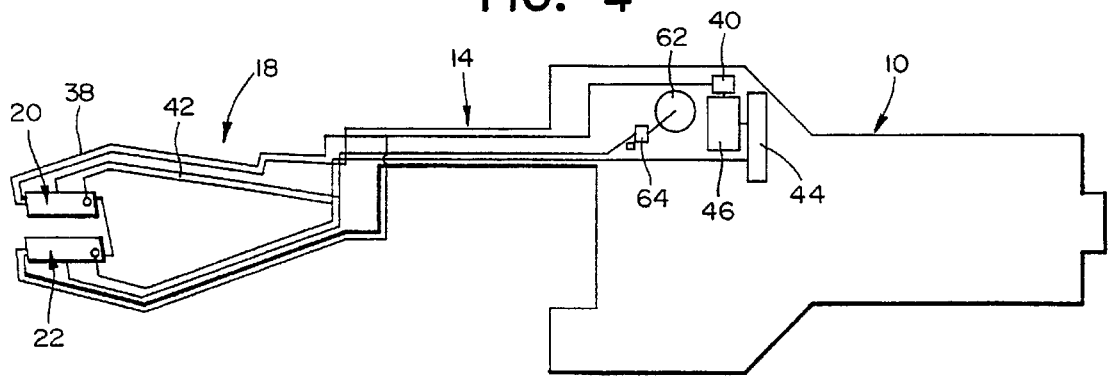
FIG. 4 is a schematic plan view illustrating the structure for circulating water or other coolant through the tree shaking pad of the present invention and also illustrating the provision of a coolant or lubricant between the slings as disclosed in my aforementioned copending application.

FIGS. 1 and 4 disclose somewhat schematically the nut tree or fruit tree shaker 10 which includes a tractor type vehicle 12 having a forwardly extending boom 14 mounted thereon. The boom preferably extends in the direction of travel of the nut tree shaker although in some instances it could extend laterally. The boom 14 is provided with a pair of forwardly extending shaker head support arms generally designated by reference numeral 16 mounted at the forward end of the boom section 14 in a manner well known in this art. The support arms 16 support a shaker head 18 suspended from the outer ends of the arms 16 in a well known manner. The aforementioned structure is conventional nut tree shaker construction with the shaker head 18 including a pair of clamping jaws 20 and 22 which can be selectively moved into clamping relation to the trunk of a nut or fruit tree (not shown) with the shaker head shaking the tree in a conventional manner for removing nuts or fruit from the tree so that the nuts or fruit will fall by gravity onto adjacent surface areas in a manner well known in the nut harvesting industry.

Figure 2:
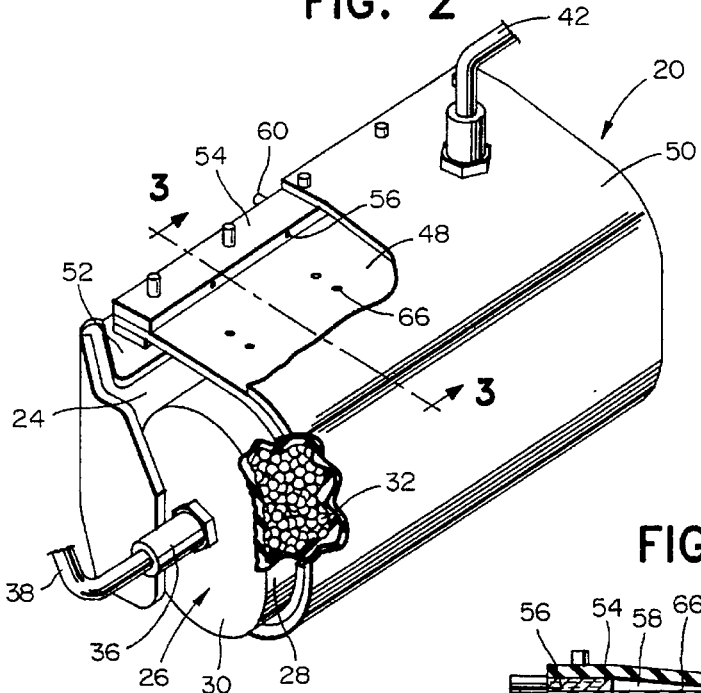
FIG. 2 is a perspective view of the filled pillow tree shaker pad and sling assembly.
Figure 3:
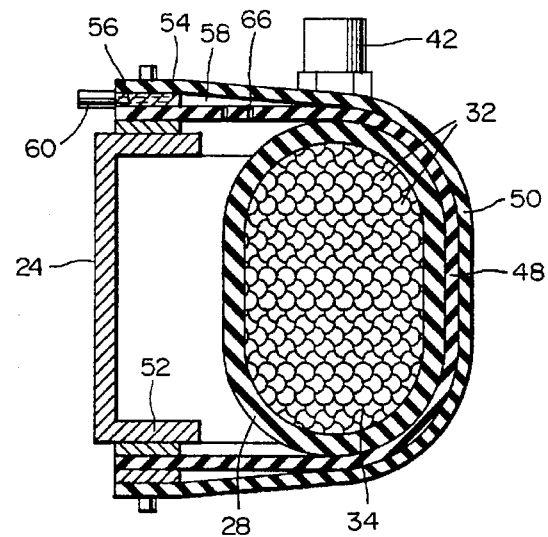
FIG. 3 is a transverse, sectional view taken along section line 3—3 on FIG. 2 illustrating further structural details of the hollow tree shaking pad in the form of a pillow and the filler medium in the form of spherical rubber balls.

As illustrated in FIG. 2, the jaw 20 includes a longitudinally extending rigid support plate 24 of channel shaped configuration having a pillow type pad 26 of this invention incorporated therein. The pillow type pad 26 is a hollow, closed flexible member of relatively thick and durable rubber or other elastomer 28 of cylindrical or oval shaped cross-sectional configuration as illustrated in FIG. 3. The ends of the hollow pillow cushion 28 are closed by end walls 30 integral with the peripheral wall to form a closed hollow pillow cushion. The interior of the pad 26 is filled with a filler medium in the form of resilient spherical balls 32 of rubber or other elastomers which are capable of being compressed when the jaws 20 and 22 are moved inwardly into clamping engagement with a tree trunk to enable the jaws to conform with the surface of the tree trunk and which, when unclamped, the resilient balls 32 will return to their generally spherical configuration so that voids or interstices will exist between adjacent balls to enable circulation of water or other coolant through the pad 26.

The end wall 30 of the pad 26 includes an inlet adaptor 36 connected to a pressurized supply line 38 extending from a water pump 40 on the nut tree shaker outwardly along the boom 14 and shaker head 18 to supply pressurized water or other coolant to the water inlet 36 and thus into the interior of the pad 26. The opposite end of the pad 26 is provided with a return line 42 communicating with the interior of the pad 26 and extending along the shaker head 18, support arms 16 and boom 14 back to a radiator 44 for cooling the returned water and a storage tank 46 connected to the radiator and supplying the water pump 40. Operation of the water circulating system is under the control of the operator of the nut tree shaker and is normally operated during periods in which the jaws 20 and 22 are in unclamped relation to a nut tree trunk.

As also illustrated, the pad 26 is supported by inner and outer slings 48 and 50 having edges attached to inwardly extending flanges 52 on the support plate 24 with the space between the slings receiving a manifold 54 with passageways 56 communicating with the space 58 between the slings for supplying liquid or other coolant between the slings from a supply line 60 which extends along the shaker head 18, support arm 16 and boom 14 to a supply tank 62, pump 64 having a suitable control for operation by the nut tree shaker operator for discharging water between the slings 48 and 50. This structure is disclosed in the aforementioned application and the inner sling 48 may be provided with apertures 66 to enable migration of coolant or lubricant not only between the slings 48 and 50 but also between the inner sling 48 and the pillow cushion 28 to lubricate and cool the components of the jaws 20 and 22 when in their clamped and unclamped position.

The size and elasticity of the balls 32 can be varied to vary the clamping characteristics of the balls and to vary the void areas or interstices between the balls when they are in unclamped position to facilitate migration of water or other coolant from the inlet 36 axially through the cushion 26 to the outlet and return line 42. Accordingly, the structure of this invention combines the advantages of both the solid rubber pad and the filled pillow pad since it has the advantage of better conformity to the shape of the tree trunk but also maintains a degree of flexibility and resiliency in the clamped position to reduce the shock loads on the bark of the tree trunk in a manner similar to a solid rubber pad. However, this invention also includes the advantage of the filled pillow pad to allow better conformity to the tree trunk with the filler medium or rubber balls returning to their spherical shape when the jaws are released from the clamped position. This enables voids or interstices to develop between adjacent balls which lets water or other coolant to migrate through the interior of the pillow pad thereby cooling it whereas pillow pads with other granular materials such as plastic bits, walnut shells or the like do not allow water to migrate when in unclamped position because they pack too tight. Even if air is forced through existing pillow type pads, air does not cool as effectively as water or other liquid coolants. Thus, the resilient characteristics of the spherical rubber members combined with the circulation of water or other liquid coolant combines the advantages of the solid rubber pad and the pillow type pad filled with solid noncompressible granular material and also includes the additional features which enable water or other liquid coolant to circulate through the pads when in unclamped relation to a tree trunk.

The nut tree shaker pad of this invention retains resiliency and elasticity when the jaws are in clamped position to obtain better conformity of the pads with the surface of the tree trunk with the resilient filler medium returning to their original shape when the pads are unclamped from the tree thereby forming the original voids or interstices between the spherical resilient balls to enable water or other liquid coolant to migrate through the pillow type cushion to maintain a desired operating temperature for the shaker pads to provide a longer life expectancy to the shaker pads and shaker pads which are more safely operated by eliminating overheating and the safety hazards caused by such overheating.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A filler medium for a flexible, tubular pillow attached to a jaw of a nut tree shaker, said filler medium comprising a plurality of discrete resilient members substantially filling the tubular pillow, said resilient members having contacting surface areas and spaced surface areas to enable the resilient members to move in relation to each other to enable the pillow to conform to a nut tree trunk surface without compressing the resilient members when the jaw is initially urged toward the nut tree surface, said resilient members being compressed to reduce the dimensions of the spaced surface areas while maintaining resiliency of said resilient members when clamping force is completely applied to the jaw for transmitting resiliently cushioned vibration forces from the jaw through the compressed resilient members to the pillow and nut tree trunk, said compressed resilient members increasing the dimension of the spaced surface areas as clamping force exerted on the jaw is reduced thereby returning said resilient members and pillow to their original shape, said resilient members are spherical rubber balls.

2. A nut tree shaker pad mounted on each of the clamping jaws of the shaker head of a nut tree shaker, said pad comprising a hollow pillow including a continuous peripheral wall and end walls of resilient material and a filler medium substantially completely filling the interior of said pillow, said filler medium comprising a plurality of resilient members having communicating interstices therebetween when the jaws of the tree shaker are in unclamped relation to a tree trunk of a nut tree, said resilient members being spherical resilient balls which are compressed but maintain some degree of flexibility and elasticity when the clamp jaws are clamped into engagement with a tree trunk of a nut tree thereby enabling the pads on the clamping jaws to flexibly and resiliently conform to the external surface of the tree trunk and flexibly and resiliently transfer vibration forces from the jaws through the resilient balls to the tree trunk.

3. The tree shaker pad as defined in claim 2 wherein said resilient balls compress to reduce the interstices between the balls, said balls maintaining their resiliency when the jaws are in clamped position on a tree trunk, the resiliency of the balls returning them to their original shape when the jaws are unclamped thereby returning the interstices between balls to their original size and communication and returning the tubular member to its original shape.

4. The tree shaker pad as defined in claim 3 wherein said pillow is supported from the clamping jaw by a sling assembly extending around a portion of the periphery of the pillow.

5. The tree shaker pad as defined in claim 4 wherein the pillow includes an in an end wall oriented axially of an outer end portion of a clamping jaw, an outlet and return line being communicated with the pillow at a point inwardly of the pillow in relation to the clamping jaw and in remote relation to the inlet on the pillow.

6. A pad for attachment to a clamping jaw comprising a hollow tubular member constructed of flexible material forming an enclosure and a filler medium substantially filling said hollow tubular member, said filler medium comprising a plurality of discrete resilient members in movable contact with each other and an interior surface of the tubular member to enable the tubular member and filler medium to conform with the surface contour of an entity being clamped by the clamping jaw, said resilient members being at least partially compressed when the clamping jaw exerts clamping force on a clamped entity for retaining the flexibility and resiliency of the hollow tubular member when clamping the clamped entity and the resiliency of said resilient members returning the filler medium and tubular member to original shape when the clamping jaw is unclamped, said resilient members being spherical balls having interstices defined by contacting spherical surfaces when the clamping jaw is unclamped.

7. The pad as defined in claim 6 wherein said tubular member includes a fluid inlet and fluids outlet adjacent opposite ends of said tubular member for flow of coolant through the tubular member and through the interstices between said resilient members when the clamping jaw is unclamped.

8. The pad as defined in claim 7 wherein said tubular member is constructed of resilient water impervious material to provide a flow path for liquid coolant from said inlet, through said interstices to said outlet.

9. The pad as defined in claim 8 wherein the clamping jaw is one of a pair of jaws on a nut tree shaker, said tubular member being supported from the jaw by a sling assembly, the liquid coolant flowing through the tubular member controlling frictional heat created by shaking movement of the jaws when clamping a tree trunk.

* * * * *

UNITED STATES PATENT AND TRADEMARK OFFICE
CERTIFICATE OF CORRECTION

PATENT NO. : 5,653,097
DATED : August 5, 1997
INVENTOR(S) : Daryl G. HILL It is certified that error appears in the above-identified patent and that said Letters Patent is hereby corrected as shown below:

Column 6, line 12, --inlet-- is inserted between "an" and "in".

Signed and Sealed this

Sixteenth Day of December, 1997

Attest:

BRUCE LEHMAN

*Attesting Officer*   *Commissioner of Patents and Trademarks*